United States Patent
Billeaud

(10) Patent No.: US 8,282,838 B2
(45) Date of Patent: Oct. 9, 2012

(54) METHOD AND APPARATUS FOR SEPARATING AND REMOVING FLUIDS FROM DRILL CUTTINGS

(76) Inventor: Michael David Billeaud, Broussard, LA (US)

(*) Notice: Subject to any disclaimer, the term of this patent is extended or adjusted under 35 U.S.C. 154(b) by 0 days.

(21) Appl. No.: 13/404,182

(22) Filed: Feb. 24, 2012

(65) Prior Publication Data

US 2012/0152860 A1 Jun. 21, 2012

Related U.S. Application Data

(63) Continuation of application No. 12/589,412, filed on Oct. 23, 2009, now Pat. No. 8,123,046.

(60) Provisional application No. 61/197,085, filed on Oct. 23, 2008.

(51) Int. Cl.
  *B01D 29/03* (2006.01)
  *B01D 29/88* (2006.01)
  *B01D 29/90* (2006.01)
  *B01D 29/94* (2006.01)
  *F26B 11/02* (2006.01)
  *F26B 11/18* (2006.01)

(52) U.S. Cl. ..... 210/771; 210/409; 210/410; 210/416.1; 175/66; 175/206; 34/397; 34/401; 34/480; 34/109; 34/587

(58) Field of Classification Search ............. 210/771, 210/409, 410, 416.1; 34/397, 401, 480, 109, 34/587; 175/66, 206
See application file for complete search history.

(56) References Cited

U.S. PATENT DOCUMENTS

| | | | | |
|---|---|---|---|---|
| 1,225,212 A * | 5/1917 | Benjamin | | 34/245 |
| 1,524,916 A * | 2/1925 | Demme | | 210/805 |
| 1,995,966 A * | 3/1935 | Delemme | | 34/109 |
| 2,746,170 A * | 5/1956 | Wilson | | 34/109 |
| 3,368,475 A * | 2/1968 | Truax | | 99/450 |
| 3,680,472 A * | 8/1972 | Skelton et al. | | 99/358 |
| 4,200,991 A * | 5/1980 | Gazzoni | | 34/587 |
| 4,424,632 A * | 1/1984 | Nakamura | | 34/587 |
| 4,489,505 A * | 12/1984 | Hench et al. | | 34/587 |
| 4,688,336 A * | 8/1987 | Egger et al. | | 34/109 |
| 6,763,605 B2 * | 7/2004 | Reddoch | | 34/58 |
| 7,373,996 B1 * | 5/2008 | Martin et al. | | 175/206 |
| 8,123,046 B2 * | 2/2012 | Billeaud | | 210/409 |

* cited by examiner

*Primary Examiner* — Thomas M Lithgow
(74) *Attorney, Agent, or Firm* — Ted M. Anthony

(57) ABSTRACT

A method and apparatus is provided for removing fluids, particularly entrained and/or adherent fluids, from drill cuttings created during the well drilling process. An apron assembly collects drill cuttings and deposits such cuttings on a central rotor having multiple distinct chambers. A first chamber is loaded with drill cuttings. The central rotor thereafter cycles to a second position wherein a pressure seal is formed around the loaded first chamber. An air knife or similar device is used to blast compressed gas at the cuttings in the sealed chamber and force the cuttings against a screen. Solid components of the cuttings remain in the sealed chamber, while liquid components pass through the screen and are collected using an auger assembly. Following such separation, the rotor is cycled again, allowing dried cuttings to empty from the first chamber. The process is repeated for each chamber of the rotor.

15 Claims, 4 Drawing Sheets

METHOD AND APPARATUS FOR SEPARATING AND REMOVING FLUIDS FROM DRILL CUTTINGS

CROSS REFERENCES TO RELATED APPLICATIONS

This is a continuation of U.S. Non-Provisional patent application Ser. No. 12/589,412, filed Oct. 23, 2009 now U.S. Pat. No. 8,123,046, which claims priority from U.S. Provisional Patent Application Ser. No. 61/197,085 filed Oct. 23, 2008, incorporated by reference.

STATEMENTS AS TO RIGHTS TO INVENTIONS MADE UNDER FEDERALLY SPONSORED RESEARCH AND DEVELOPMENT

NONE

BACKGROUND OF THE INVENTION

1. Field of the Invention

The present invention relates generally to the separation and removal of fluids, such as drilling mud, additives and/or contaminants, from solid components of drill cuttings created during the oil and gas well drilling process. More particularly still, the present invention relates to a method and apparatus for the removal of entrained and/or adherent fluids from drill cuttings, thereby permitting recovery of such fluids, as well as efficient disposal of dried solid components of said drill cuttings.

2. Description of the Related Art

As an oil or gas well is being drilled, drilling fluids (often referred to as "drilling mud") are typically pumped down the drill pipe, and circulated up the annular space existing between the drill pipe and the inner face of the wellbore. Drilling fluids circulated to the drilling rig and out of a well often contain pieces of broken rock and other solid debris from the well commonly referred to as "cuttings" or "drill cuttings". In most cases, the drilling fluids leaving a well, together with associated drill cuttings, are directed to at least one device which is specifically designed to separate the drill cuttings from the mud. Such devices include, but are not limited to, "shale shakers," desanders, desilters, hydrocyclones and centrifuges.

If drill cuttings are not removed from the effluent mud stream exiting a well, such cuttings would remain in the active mud system and would be recirculated into the well. However, such materials can dramatically alter the characteristics and performance of drilling mud in the well and, in turn, negatively impact the overall drilling process. Further, recirculation of drill cuttings can also increase wear and tear in mud pumps and other mechanical equipment utilized in the drilling process. As such, shale shakers and other similar devices are frequently necessary to efficiently separate the drill cuttings from the drilling mud as such mud is circulated out of a well.

In many cases, shale shakers utilize a series of screens arranged in tiered or flat disposition relative to one another. Such screens are often made to vibrate in order to encourage separation of liquids from the drill cuttings. The drilling fluids generally fall through the screens by gravity, while the solid cuttings typically pass over the end of the screens.

After drilled solids and other debris have been separated from the drilling mud effluent stream exiting a well, it is necessary to dispose of such cuttings. Unfortunately, the disposal of such drill cuttings can present a number of practical problems. In many cases, such drill cuttings are discharged directly into the surrounding environment. However, even though drill cuttings leaving a shale shaker or other separation device may have been separated from a well's effluent mud stream, such cuttings nonetheless typically include entrained and/or adherent mud and other fluids which could be damaging to the surrounding environment.

In order for drilling fluid to accomplish its intended objectives, it is often necessary to adjust or control certain characteristics of such drilling fluid. Frequently, chemicals and/or other additives are often incorporated into such drilling fluids. Many of these additives, as well as drilling fluids that are oil-based or synthetic-based, can be environmentally harmful. As such, it is often undesirable, and a violation of environmental laws or regulations, to release such fluid-laden cuttings directly into the surrounding environment.

In order to avoid environmental contamination and comply with applicable governmental regulations, drill cuttings are frequently transported from a drilling rig to an off-site facility for disposal. In order to accomplish such off-site disposal, drill cuttings are generally loaded into boxes or other storage containers for transportation away from the rig. While this solution can be generally functional, it is not without significant problems.

One major problem associated with the off-site disposal of drill cuttings is increased cost. In most cases, special equipment is needed to move fluid-laden drill cuttings from a rig's shale shakers to another location on the rig where storage boxes are loaded. Such equipment is often in the form of complicated and elaborate conveyors, augers and/or vacuum units. Moreover, large numbers of storage boxes must be rented or purchased in order to accommodate such cuttings. All of this added equipment and labor increases the costs associated with the drilling process.

Existing methods of cleaning and/or drying drill cuttings in order to remove surface contaminants prior to discharge of such cuttings into the environment have failed to produce satisfactory results. Frequently, existing methods of treating drill cuttings require large amounts of equipment, which can cause space problems on most drilling rigs and add to the overall expense of a drilling project. Further, such existing methods of cleaning and/or drying cuttings frequently utilize surfactants and/or other chemicals which must be disposed of and isolated from the surrounding environment.

Accordingly, the need exists for a method and apparatus for separation of entrained and/or adherent fluids from fluids-laden drill cuttings.

It is an object of the present invention to provide a highly efficient and effective means of separating and removing fluids, and particularly entrained and/or adherent fluids, from drill cuttings.

It is yet another object of the present invention to provide a means of separating and reclaiming fluids from drill cuttings which utilizes a relatively small amount of equipment and, therefore, has minimal space requirements.

SUMMARY OF THE INVENTION

The present invention comprises a method and apparatus for highly effective separation of fluids, such as drilling mud, mud additives and contaminants, from solid drill cutting components generated during the drilling process. The present invention permits efficient recovery of such separated fluids for re-use and/or disposal, is easily adaptable with existing rig equipment, and requires significantly less space than existing devices currently used to separate liquids from drill cuttings.

In the preferred embodiment, the present invention is beneficially positioned at a location that permits receipt of fluids-laden drill cuttings such as, for example, downstream from the outlet of a conventional shale shaker or other similar device. In the preferred embodiment, such fluid-laden drill cuttings can be discharged directly in an apron assembly which facilitates collection and even distribution of said cuttings into the present invention.

An elongate central rotor member defining a plurality of separate chambers is positioned at or near the base of said apron assembly. In the preferred embodiment, said rotor member is oriented substantially perpendicular to the flow direction of drill cuttings exiting the apron assembly, and rotates about its longitudinal axis. In the preferred embodiment, the rotor member is driven by an air cylinder, while each chamber of said central rotor member has a beneficially-shaped profile. Said rotor member receives and meters the drill cuttings from the apron assembly, transports such drill cuttings through the drying process, and discharges solid materials following such drying process.

In operation, fluids-laden drill cuttings are discharged on the apron assembly, and thereafter directly into a first open chamber of said rotor member. Once a desired amount of fluids-laden drill cuttings is received within such chamber, an air cylinder cycles, thereby rotating said rotor member and moving said first chamber to a second position. In such second position, said first chamber (and the fluids-laden cuttings contained therein) includes a pressure seal using a flap-type sealing element.

A manifold system provides compressed gas (in the preferred embodiment, the compressed gas is air) to an air knife or other similar device mounted in proximity to said first chamber. Compressed air exiting said air knife or similar device forces the solids-laden drill cuttings against a screen. Although solids cannot pass through such screen, liquids from said fluid-laden drill cuttings are forced through the screen by the exhausted air. In the preferred embodiment, fluids separated from said drill cuttings are deposited into an auger system, which then directs such fluids in the rig's active mud system for re-use or, alternatively, to separate facilities for storage and/or disposal.

Following the drying process, the rotor assembly is again rotated. Such rotation isolates said first chamber from exposure to compressed gases from said air knife or similar device. In this position, dried solid materials from such drill cuttings are discharged by gravity and fall into a basin or other collection means. Thereafter, said rotor member rotates, and said (now empty) first compartment reveals itself to the apron assembly once again.

BRIEF DESCRIPTION OF DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed.

DETAILED DESCRIPTION OF A PREFERRED EMBODIMENT

Figure 1:
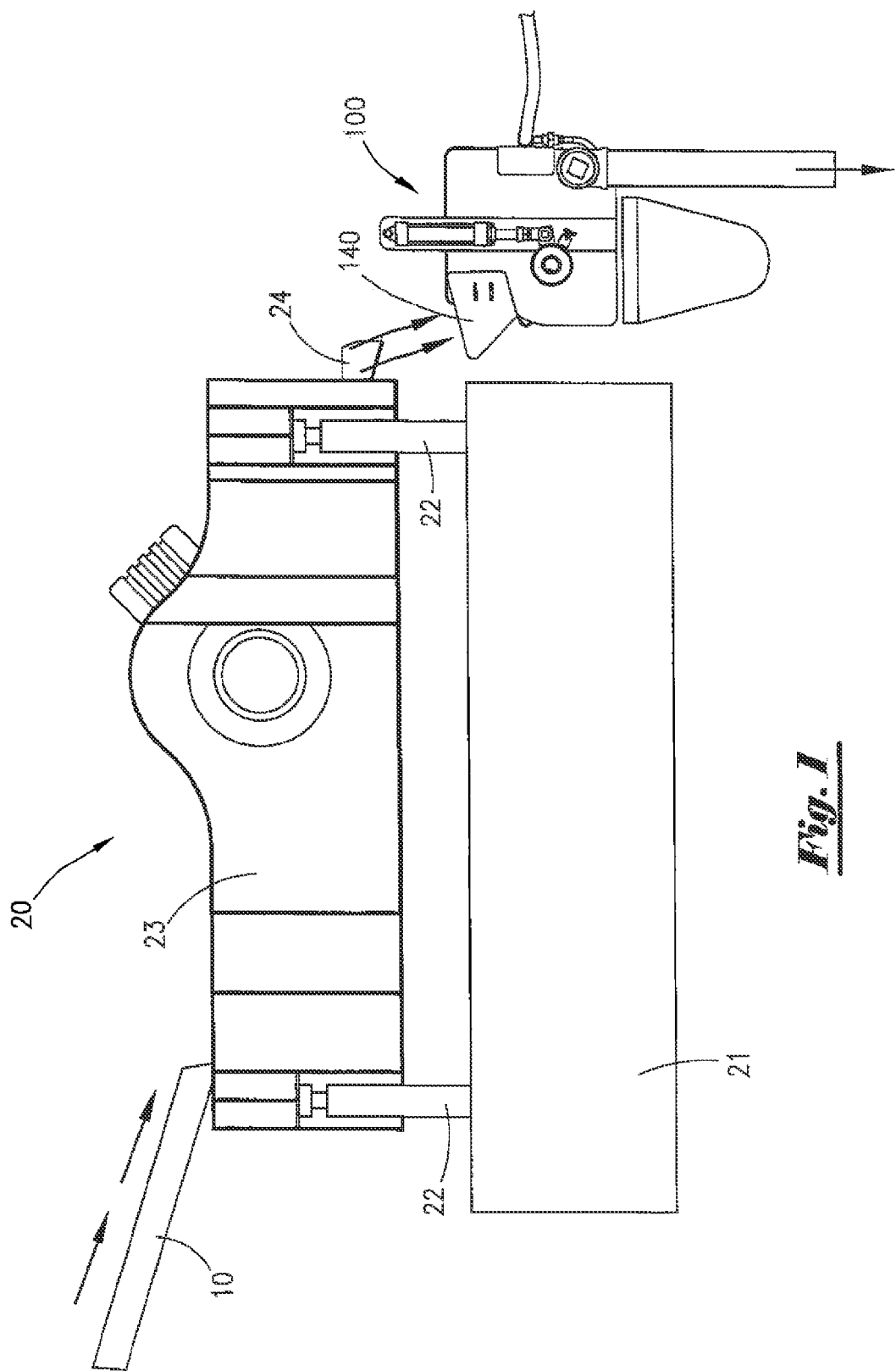
FIG. 1 depicts a side view of the separation apparatus of the present invention installed on a drilling rig.

FIG. 1 depicts a side view of separation apparatus 100, also referred to herein as separation device 100, of the present invention installed on a conventional drilling rig. The present invention provides a method and apparatus for highly effective separation of fluids, such as drilling mud, mud additives and contaminants, from the solid components of oil well drill cuttings. The present invention permits efficient recovery of such separated fluids for re-use and/or disposal, is easily adaptable with existing rig equipment, and requires significantly less space than conventional devices currently used to separate liquids from drill cuttings.

In the preferred embodiment, separation device 100 of the present invention is positioned at a location that beneficially permits efficient receipt of fluids-laden drill cuttings such as, for example, downstream from the outlet of a conventional shale shaker assembly 20. As depicted in FIG. 1, fluids-laden drill cuttings are conveyed to shale shaker assembly 20 via ramp 10 or other similar means. In most cases, fluids-laden drill cuttings exit a well via a drilling rig's returns line, and are conveyed to a shale shaker (such as shale shaker assembly 20) prior to further handling.

Although shale shakers and similar equipment can have many different configurations, conventional shale shaker 20 depicted in FIG. 1 comprises base 21, a plurality of support columns 22 and shaker bed 23. After being processed through shale shaker assembly 20, fluid-laden drill cuttings exit said shale shaker via shale shaker outlet 24. As depicted in FIG. 1, such fluid-laden drill cuttings are discharged into apron assembly 140 of separation device 100 of the present invention which facilitates collection and distribution of said cuttings.

Figure 2:
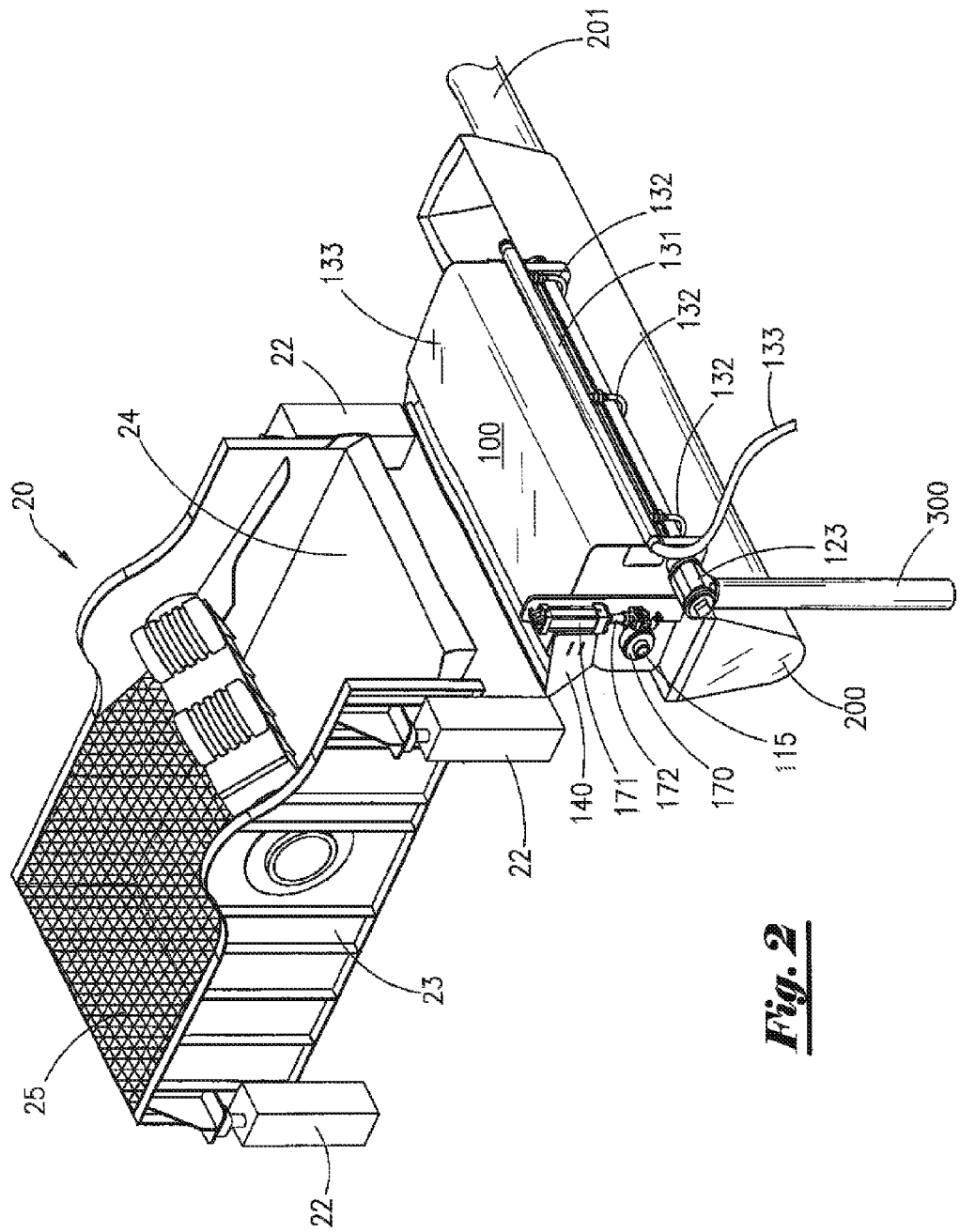
FIG. 2 depicts an overhead perspective view of the separation apparatus of the present invention installed on a drilling rig.

FIG. 2 depicts an overhead perspective view of separation device 100 of the present invention installed on a drilling rig. As depicted in FIG. 2, separation device 100 is beneficially positioned downstream from shale shaker outlet 24. As discussed above, fluids-laden drill cuttings exit a well via a drilling rig's returns line, and are conveyed to shale shaker assembly 20 via ramp 10 or other similar means.

Conventional shale shaker 20 depicted in FIG. 2 generally comprises base 21, a plurality of support columns 22 and shaker bed 23. Screen 25 is disposed at or near the upper surface of shaker bed 23. After being processed through shale shaker assembly 20, fluid-laden drill cuttings exit said shale shaker via shale shaker outlet 24 and are discharged into apron assembly 140 of separation device 100.

Figure 3:
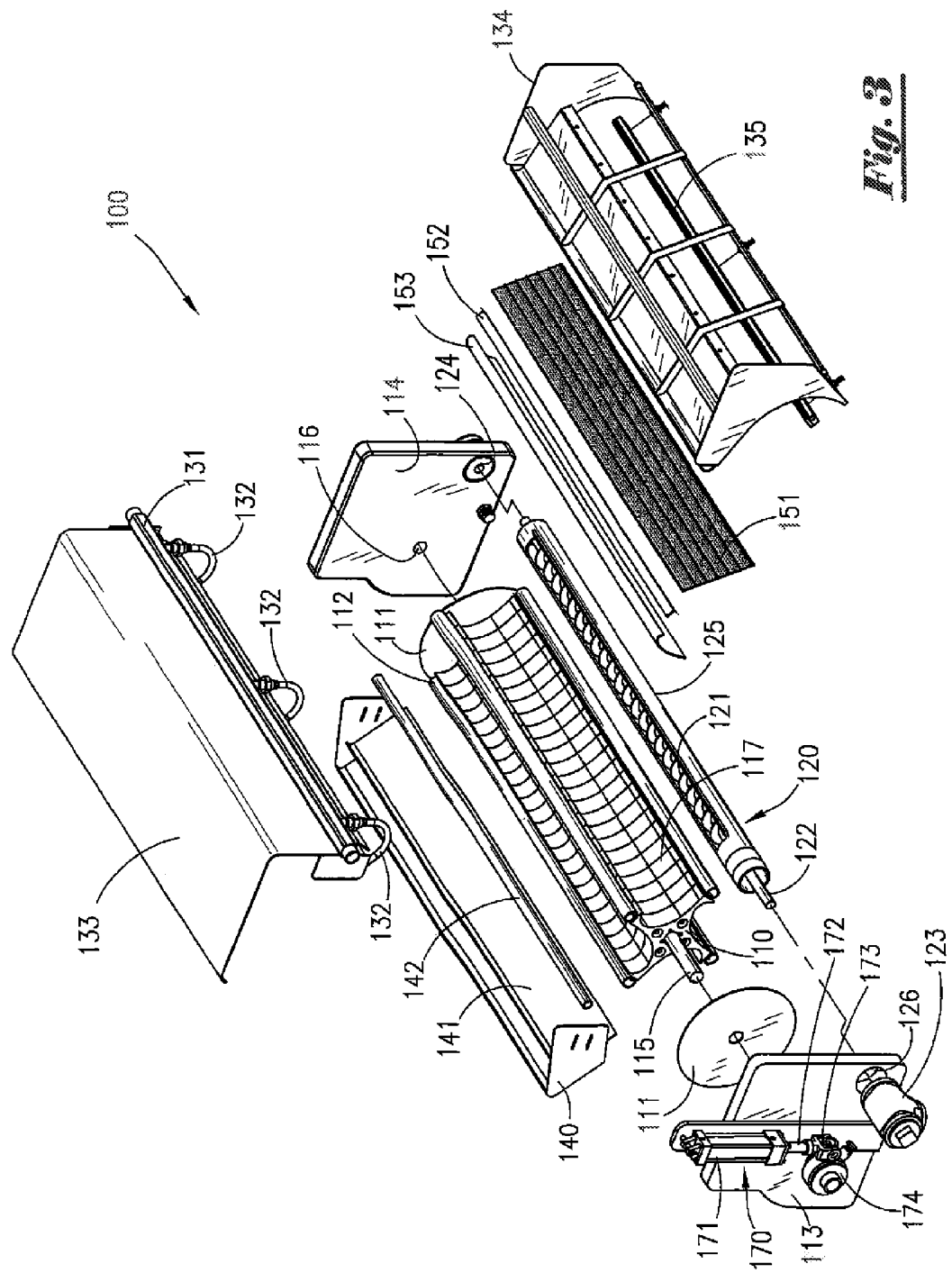
FIG. 3 depicts an exploded perspective view of the separation apparatus of the present invention.

FIG. 3 depicts an exploded perspective view of separation device 100 of the present invention. Central rotor member 110 has a plurality of projections 117 extending radially outward from the center of rotor member 110, thereby defining a plurality of separate chambers or recesses along the outer surface of said rotor member 110. In the preferred embodiment, said rotor member 110 is positioned at or near the base of apron assembly 140. Elongate sealing members 112 are disposed at or near the ends of projections 117, and generally extend along the length of said projections 117. In the preferred embodiment, rotor member 110 further has central drive shaft 115, and end plates 111 disposed on said drive shaft 115.

Drive shaft 115 is rotatably received within aperture 116 of end plate 114 at one end; drive shaft is similarly rotatably mounted to end plate 113 at its other end. Drive shaft 115 rotates about its longitudinal axis. In the preferred embodiment, projections 117 define at least three separate chambers that are isolated from one another along rotor member 110. As discussed in detail below, rotor member 110 receives and meters drill cuttings, transports such drill cuttings through the fluid separation process, and discharges dried solid materials following such separation process.

Rotor member 110 is beneficially driven by a mechanism for rotating said rotor member about its longitudinal axis. Referring to FIG. 3, in the preferred embodiment, rotor member 110 is driven by air cylinder assembly 170 comprising air cylinder 171 and piston 172. Piston 172 is attached to drive shaft end housing 174 using connection bracket 173. As piston 172 of air cylinder 171 extends or strokes, drive shaft 115 of central rotor member 110 rotates about its central longitudinal axis. In the preferred embodiment of the present invention, drive shaft end housing 174 incorporates a ratchet mechanism so that central rotor member 110 rotates in only a single direction and, further, rotates or cycles a fixed amount. It is to be observed that rotation of rotor member 110 can be beneficially accomplished using other drive mechanisms such as, by way of illustration, an electric motor.

Still referring to FIG. 3, auger assembly 120 is mounted near the base of rotor member 110. Rotor assembly 120 generally comprises elongate screw auger 121 disposed within auger housing 125. Screw auger 121 has elongate central drive shaft 122; one end of said elongate central drive shaft 122 is rotatably disposed within aperture 124 in first side wall 113, while the other end of central drive shaft 122 extends through aperture 126 in second side wall 114. Auger outlet connection 123 is affixed to said second side wall 114 and is in fluid communication with aperture 126.

In the preferred embodiment, apron assembly 140 is mounted along the opposite side of rotor member 110 from auger assembly 120. Apron assembly 140 generally comprises a trough-like structure having sloped surface 141, sloped in the direction of rotor member 110. Elongate sealing element 142 is also provided.

Support frame 134 is provided along one side of rotor member 110. Air knife 135 is attached to support frame 134. Screen member 151, connection member 152 and flap-like sealing element 153 are provided. Cover 133 is disposed generally over rotor member 110. In the preferred embodiment, manifold 131 is attached to cover 133. Conduits 132 extend from manifold 131, and can be used to provide air or other gases to air knife 135.

Figure 4:
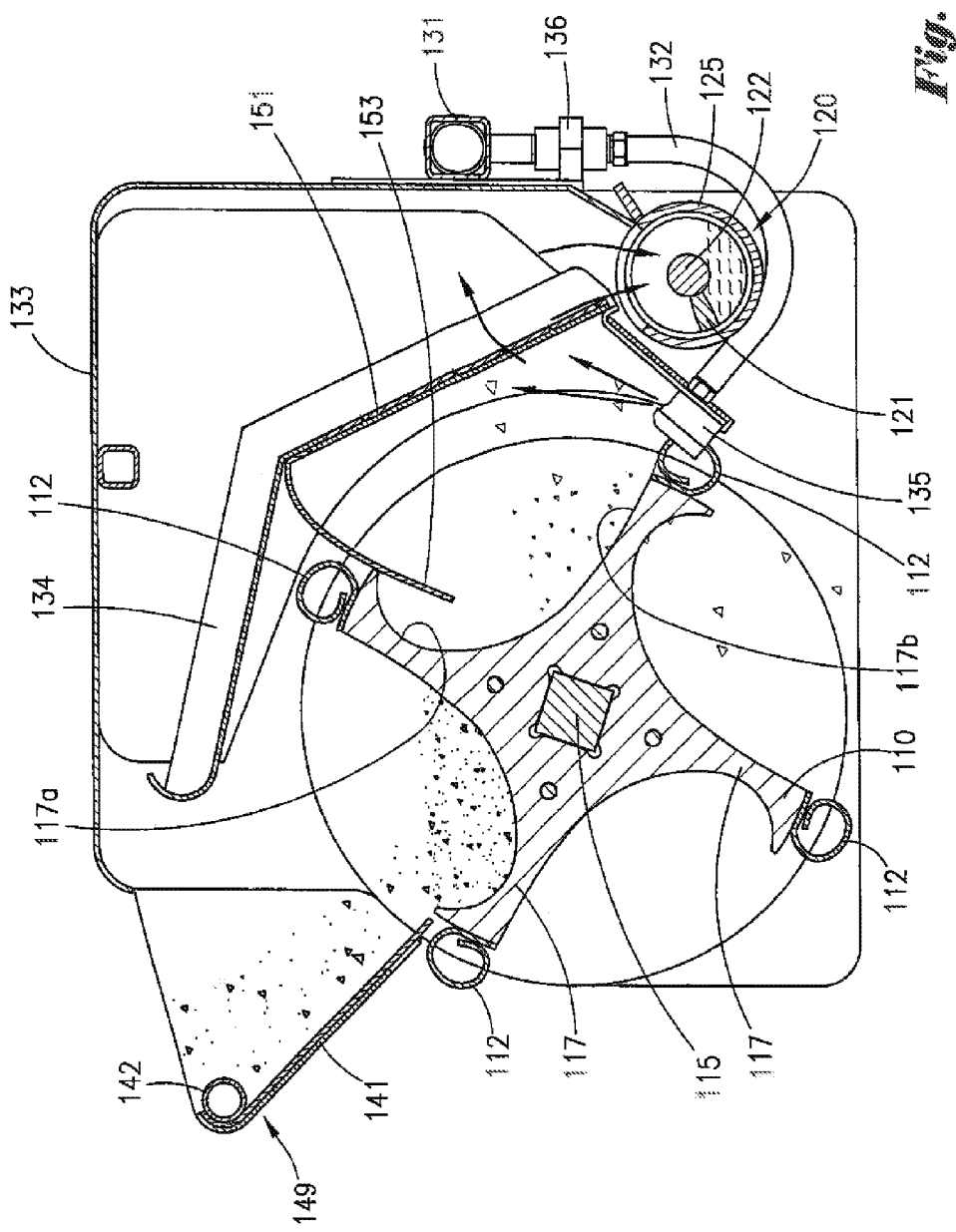
FIG. 4 depicts a side sectional view of the separation apparatus of the present invention.

FIG. 4 depicts a side sectional view of the separation device of the present invention. Central rotor member 110 has a plurality of projections 117 extending radially outward from the center of rotor member 110, thereby defining a plurality of separate chambers or recesses along the length of rotor number 110. In the preferred embodiment, rotor member 110 has four separate chambers formed by projections 117; however, it is to be observed that rotor member 110 could have more or less chambers depending upon a particular application. Further, in the preferred embodiment, the opposing surfaces of projections 117 are beneficially shaped to define a relatively gentle curve on surface 117a, and generally concave shape on surface 117b.

Elongate sealing members 112 are disposed at or near the outer ends of projections 117, and generally extend along the length of said projections 117. In the preferred embodiment, said sealing members 112 comprise looped elastomeric material. Said sealing members are compressed when contacting other elements of the present invention and capable of forming a pressure seal.

Still referring to FIG. 4, auger assembly 120 is mounted near the base of rotor member 110. Rotor assembly 120 generally comprises screw auger 121 having central drive shaft 122 disposed within auger housing 125. In the preferred embodiment, apron assembly 140 is mounted along the opposite side of rotor member 110 from auger assembly 120. Apron assembly 140 generally comprises a trough-like structure having sloped surface 141, wherein said surface is sloped in the direction of rotor member 110. Elongate sealing element 142 is also provided.

Support frame 134 is provided along one side of rotor member 110. Air knife 135 is attached to support frame 134. Screen member 151, connection member 152 and flap-like sealing element 153 are provided. Cover 133 is disposed generally over rotor member 110. In the preferred embodiment, manifold 131 is attached to end plates 113 and 114. Conduits 132 extend from manifold 131, and can be used to provide air or other gases to air knife 135.

In operation, fluids-laden drill cuttings are discharged (such as, for example, from shale shaker outlet 24 depicted in FIG. 1) on to apron assembly 140. Said fluids-laden drill cuttings collect and are gravity fed down sloped surface 141 of apron assembly 140 directly into a first open chamber of said rotor member 110, said first open chamber or recess formed by two projections 117 of rotor member 110. Once a desired amount of fluids-laden drill cuttings is received within such chamber, air cylinder 171 is actuated, thereby rotating said rotor member 100 a desired amount (in the configuration depicted in FIG. 4, a quarter revolution in the clockwise direction). Following such rotation, said first chamber is positioned in a second position.

In such second position, flap-type sealing element 153 forms a pressure seal for said first chamber (and the fluids-laden cuttings contained therein). An air compressor of other gas supply source (not pictured in FIG. 4) provides compressed gas to manifold 131, through conduits 132, and into an air knife 135. Compressed gas exiting air knife 135 forces the solids-laden drill cuttings against the internal surface of screen 151. Although solids cannot pass through such screen, liquids from said fluid-laden drill cuttings are forced through the screen by the exhausted air. In this process, g-forces act on said cuttings at or near the screen surface, thereby enhancing the separation process. In the preferred embodiment, fluids separated from said drill cuttings are deposited into auger assembly 120, which in turn directs such fluids in the drilling rig's active mud system for re-use or, alternatively, to separate facilities for storage and/or disposal. The surface geometry of surfaces 117a and 117b in sealed first chamber encourages the drill cuttings to rotate within said chamber, thereby increasing the frequency with which such cuttings are exposed to gases from air knife 135 (and the resultant separation effect).

Following the drying process, air cylinder 171 is again actuated so that rotor member 110 is again rotated a desired amount (for the embodiment depicted in FIG. 4, a quarter revolution in the clockwise direction). Such rotation isolates said first chamber from exposure to compressed gases from air knife 135. In this position, dried solid materials from such drill cuttings are discharged by gravity and fall into a basin or other collection means. Thereafter, air cylinder 171 again actuates, rotor member 110 rotates a desired amount (for the embodiment depicted in FIG. 4, a quarter revolution in the clockwise direction), and said (now empty) first chamber of rotor member 110 reveals itself to apron assembly 140 once again.

Throughout this process, multiple chambers of rotor member 110 are simultaneously being utilized. As drill cuttings from apron assembly 140 are being loaded into one chamber, compressed gases from air knife 135 are being used to dry cuttings in another (previously filled) chamber, while dried solids are being dumped from yet another chamber (thereby readying such particular chamber for subsequent loading with more drill cuttings from apron assembly 140). This process continually repeats itself.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for separating and removing fluids from drill cuttings comprising:
    a. an elongate rotor assembly having a plurality of chambers along its outer surface;
    b. a screen disposed adjacent to said rotor assembly, wherein said screen spans at least one chamber of said rotor assembly;
    c. an air knife having an outlet, wherein said outlet is directed substantially at said screen;
    d. a mechanism for rotating said elongate rotor assembly; and
    e. an apron assembly having a sloped surface, wherein said sloped surface is sloped toward said elongate rotor assembly.

2. The apparatus of claim 1, wherein said mechanism for rotating said elongate rotor assembly comprises an air cylinder.

3. An apparatus for separating and removing fluids from drill cuttings comprising:
    a. an elongate rotor assembly having a plurality of elongate projections running substantially along the length of said rotor assembly, wherein said elongate projections define a plurality of separate chambers along the outer surface of said rotor assembly;
    b. a screen disposed adjacent to said rotor assembly, wherein said screen spans at least one chamber of said elongate rotor assembly;
    c. an air knife having an outlet, wherein said outlet is directed substantially at said screen; and
    d. a mechanism for rotating said elongate rotor assembly.

4. The apparatus of claim 3, further comprising an apron assembly having a sloped surface, wherein said sloped surface is sloped toward said elongate rotor assembly.

5. The apparatus of claim 4, further comprising an apron assembly having a sloped surface, wherein said sloped surface is sloped toward said elongate rotor assembly.

6. The apparatus of claim 5, wherein said mechanism for rotating said elongate rotor assembly comprises an air cylinder.

7. The apparatus of claim 6, wherein said elongate projections have a first side and a second side, and said first and second sides have curved surfaces.

8. The apparatus of claim 7, wherein said curved surface of said first side has a substantially concave shape.

9. The apparatus of claim 3 further comprising a basin for recovering liquids disposed on the outside of said screen.

10. The apparatus of claim 9, wherein said basin comprises an auger assembly.

11. A method of treating drill cuttings and reclaiming drilling fluids comprising:
    a) depositing drill cuttings directly from a shale shaker to a separation apparatus, said separation apparatus comprising:
        i. an elongate rotor assembly having a plurality of chambers along its outer surface;
        ii. a screen disposed adjacent to said rotor assembly, wherein said screen spans at least one chamber of said rotor assembly;
        iii. an air knife having an outlet, wherein said outlet is directed substantially at said screen; and
        iv. a mechanism for rotating said elongate rotor assembly; and
    b) directing compressed gas at said drill cuttings to separate entrained or adherent fluids from said drill cuttings; and
    c) collecting said separated fluids.

12. The method of claim 11, further comprising removing substantially dry solids from said separation apparatus.

13. The method of claim 12, further comprising disposing of said substantially dry solids.

14. The method of claim 11, further comprising transporting said separated fluids away from said separation apparatus.

15. The method of claim 14, further comprising commingling said separated fluids with an active mud system of a drilling rig.

* * * * *